US011928183B2

(12) United States Patent
Sun et al.

(10) Patent No.: US 11,928,183 B2
(45) Date of Patent: Mar. 12, 2024

(54) IMAGE PROCESSING METHOD, IMAGE PROCESSING DEVICE AND COMPUTER READABLE MEDIUM, FOR ACQUIRING IMAGE SAMPLE DATA FOR TRAINING AN ATTRIBUTE RECOGNITION MODEL

(71) Applicant: LEMON INC., Grand Cayman (KY)

(72) Inventors: Jingna Sun, Beijing (CN); Weihong Zeng, Beijing (CN); Peibin Chen, Beijing (CN); Xu Wang, Beijing (CN); Chunpong Lai, Los Angeles, CA (US); Shen Sang, Los Angeles, CA (US); Jing Liu, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 124 days.

(21) Appl. No.: 17/532,537

(22) Filed: Nov. 22, 2021

(65) Prior Publication Data
US 2023/0034370 A1   Feb. 2, 2023

(30) Foreign Application Priority Data

Jul. 29, 2021 (CN) .......................... 202110863483.8

(51) Int. Cl.
  *G06F 18/214*   (2023.01)
  *G06F 16/532*   (2019.01)
  (Continued)

(52) U.S. Cl.
  CPC ........ *G06F 18/2155* (2023.01); *G06F 16/532* (2019.01); *G06F 18/24* (2023.01); *G06V 40/168* (2022.01)

(58) Field of Classification Search
  CPC .... G06F 18/2155; G06F 18/24; G06F 16/532; G06F 16/55; G06V 40/16; G06V 10/776; G06V 10/778; G06V 10/82
  See application file for complete search history.

(56) References Cited

U.S. PATENT DOCUMENTS

2013/0132311 A1   5/2013   Liu et al.

FOREIGN PATENT DOCUMENTS

CN   104318242 A   1/2015
CN   109635843 A   4/2019
(Continued)

OTHER PUBLICATIONS

"Paulina Hensman et al., The Impact of Imbalanced Training Data for Convolutional Neural Networks, Degree Project, In Computer Science, First Level, Stockholm, Sweden 2015" (Year: 2015).*
(Continued)

*Primary Examiner* — Andrae S Allison
*Assistant Examiner* — Phuong Hau Cai
(74) *Attorney, Agent, or Firm* — Faegre Drinker Biddle & Reath LLP

(57) ABSTRACT

An image processing method includes acquiring a set of image samples for training an attribute recognition model, wherein the set of image samples includes a first subset of image samples with category labels and a second subset of image samples without category labels; training a sample prediction model using the first subset of image samples, and predicting categories of the image samples in the second subset of image samples using the trained sample prediction model; determining a category distribution of the set of image samples based on the category labels of the first subset of image samples and the predicted categories of the second subset of image samples; and acquiring a new image sample if the determined category distribution does not conform to the expected category distribution, and adding the acquired new image sample to the set of image samples.

18 Claims, 4 Drawing Sheets

(51) Int. Cl.
  *G06F 18/24*   (2023.01)
  *G06V 40/16*   (2022.01)

(56) References Cited

FOREIGN PATENT DOCUMENTS

| CN | 112784884 | A | * | 5/2021 |
| CN | 112784884 | A | | 5/2021 |
| CN | 112949722 | A | | 6/2021 |
| CN | 112132179 | A | | 12/2022 |

OTHER PUBLICATIONS

"Tina Babu et al., Robust Magnification Independent Colon Biopsy Grading System over Multiple Data Sources, CMC, 2021, vol. 69, No. 1, Computers, Materials & Continua Mar. 2021" (Year: 2021).*

"Flood Sung et al., Learning to Compare: Relation Network for Few-Shot Learning, IEEE Conference on Computer Vision and Pattern Recognition CVPR. 2018, pp. 1199-1208" (Year: 2018).*

"Bo Tang et al. KernelADASYN: Kernel Based Adaptive Synthetic Data Generation for Imbalanced Learning, IEEE, 2015 IEEE Congress on Evolutionary Computation (CEC)" (Year: 2015).*

"Pamela Johnston et al., A review of digital video tampering: From simple editing to full synthesis, Digital Investigation 29 2019, 75-81, ScienceDirect" (Year: 2019).*

"Gustavo E. et al., A study of the Behavior of Several Methods for Balancing Machien Learning Traning Data, Sigkdd Exploration, vol. 6, Issue 1—pp. 20-29, 2004" (Year: 2004).*

\* cited by examiner

IMAGE PROCESSING METHOD, IMAGE PROCESSING DEVICE AND COMPUTER READABLE MEDIUM, FOR ACQUIRING IMAGE SAMPLE DATA FOR TRAINING AN ATTRIBUTE RECOGNITION MODEL

CROSS-REFERENCE TO RELATED APPLICATION

The present application claims priority to P.R.C. patent application No. 202110863483.8, filed Jul. 29, 2021, and entitled "IMAGE PROCESSING METHOD, IMAGE PROCESSING DEVICE AND COMPUTER READABLE MEDIUM", the entirety of which is incorporated herein by reference.

TECHNICAL FIELD

The present disclosure relates to an image processing method, an image processing device and a computer readable medium.

BACKGROUND

Image attribute recognition judges the attributes of the current image by analyzing the input image. Existing algorithms based on deep learning need a lot of labeled data to be trained. However, many attributes (for example, the attribute of human face) have unclear category boundaries, numerous categories and unbalanced category distribution. Unbalanced category distribution of sample data will lead to lower recognition accuracy of attribute recognition model. Therefore, higher requirements are raised for the labeling quality of sample data and the rationality of category distribution. Most of the existing algorithms are carried out according to the processes of collection, labeling, training and re-collection. However, for sample data with imbalanced category distribution, directional data supplement cannot be done quickly, which creates a serious bottleneck in the iterative process of attribute recognition model development.

SUMMARY OF THE INVENTION

The summary of the invention is provided to introduce concepts in a brief form, which will be described in detail in the following detailed description section. This summary is not intended to identify the key features or essential features of the technical solution to be protected, nor is it intended to limit the scope of the technical solution to be protected.

According to some embodiments of the present disclosure, there is provided an image processing method, comprising: acquiring a set of image samples for training an attribute recognition model, wherein the set of image samples comprises a first subset of image samples with category labels and a second subset of image samples without category labels; training a sample prediction model using the first subset of image samples, and predicting categories of the image samples in the second subset of image samples using the trained sample prediction model; determining a category distribution of the set of image samples based on the category labels of the first subset of image samples and the predicted categories of the second subset of image samples; and acquiring a new image sample directionally if the determined category distribution does not conform to an expected category distribution, and adding the acquired new image sample to the set of image samples so that the category distribution of the set of image samples conforms to the expected category distribution.

According to some embodiments of the present disclosure, there is provided an image processing apparatus, comprising: a sample acquisition unit configured to acquire a set of image samples for training an attribute recognition model, wherein the set of image samples comprises a first subset of image samples with category labels and a second subset of image samples without category labels; a sample prediction unit configured to train a sample prediction model with the first subset of image samples and identify categories of the image samples in the second subset of image samples using the trained sample prediction model; and a distribution determination unit configured to determine the category distribution of the set of image samples based on the category labels of the first subset of image samples and the predicted categories of the second subset of image samples, wherein the sample acquisition unit acquires a new image sample directionally if the determined category distribution does not conform to an expected category distribution, and adds the acquired new image sample to the set of image samples so that the category distribution of the set of image samples conform to the expected category distribution.

According to some embodiments of the present disclosure, there is provided an electronic device including a memory; and a processor coupled to the memory, the processor configured to execute the method according to embodiments of the present disclosure based on instructions stored in the memory.

According to some embodiments of the present disclosure, there is provided a computer-readable storage medium having stored thereon a computer program which, when executed by a processor, performs a method according to embodiments of the present disclosure.

Other features, aspects and advantages of the present disclosure will become apparent from the following detailed description of exemplary embodiments of the present disclosure with reference to the accompanying drawings.

BRIEF DESCRIPTION OF THE DRAWINGS

Preferred embodiments of the present disclosure will be described below with reference to the accompanying drawings. The accompanying drawings, which are illustrated herein to provide a further understanding of the disclosure, are incorporated in and form a part of this specification together with the detailed description below, and serve to explain the disclosure. It should be understood that the drawings in the following description only refer to some embodiments of the present disclosure, and do not constitute limitations on the present disclosure. In the drawings.

Figure 1:
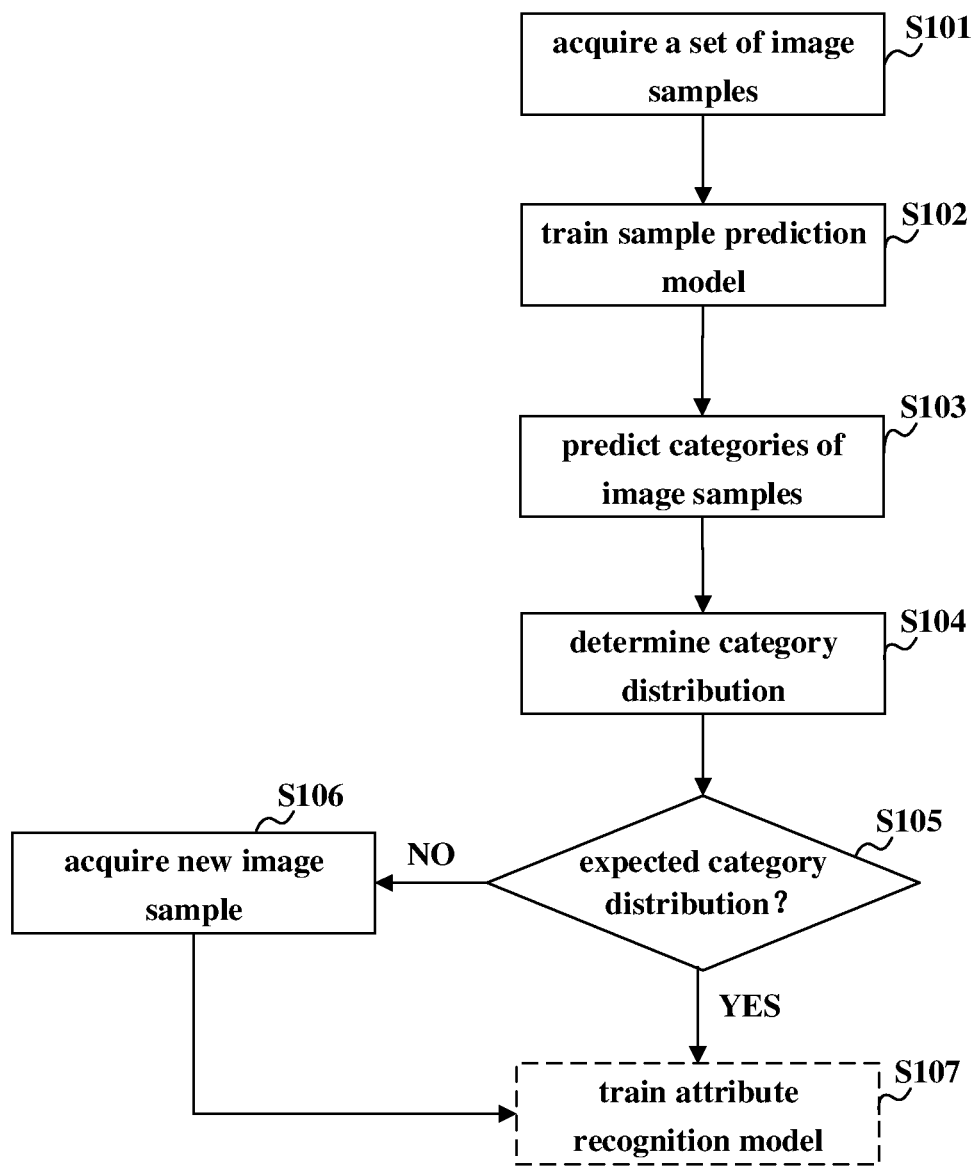
FIG. 1 is a flowchart illustrating an image processing method according to some embodiments of the present disclosure.

It should be understood that for convenience of description, the dimensions of various parts shown in the drawings are not necessarily drawn according to the actual scale relationship. Same or similar reference numerals are used in the drawings to indicate the same or similar parts. Therefore, once an item is defined in one figure, it may not be discussed further in the following figures.

DETAILED DESCRIPTION

The technical solutions in the embodiments of the present disclosure will be described clearly and completely with reference to the drawings in the embodiments of the present disclosure, but obviously, the described embodiments are only part of the embodiments of the present disclosure, not all of them. The following description of the embodiments is merely illustrative in nature, and in no way serves as any limitation on the disclosure and its application or use. It should be understood that the present disclosure may be embodied in various forms and should not be construed as limited to the embodiments set forth herein.

It should be understood that each step recorded in the method embodiments of the present disclosure can be performed in a different order and/or in parallel. In addition, method embodiments may include additional steps and/or omit performing the illustrated steps. The scope of the present disclosure is not limited in this respect. Unless otherwise specified, the relative arrangement of components and steps, numerical expressions and numerical values set forth in these embodiments should be interpreted as merely exemplary and not limit the scope of the disclosure.

As used in the present disclosure, the term "including" and its variants mean an open term that includes at least the latter elements/features, but does not exclude other elements/features, that is, "including but not limited to". In addition, the term "comprising" and its variants as used in the present disclosure means an open term that includes at least the latter elements/features, but does not exclude other elements/features, that is, "including but not limited to". Therefore, including is synonymous with containing. The term "based on" means "based at least in part".

Reference to "one embodiment", "some embodiments" or "embodiments" throughout the specification means that a particular feature, structure or characteristic described in connection with embodiments is included in at least one embodiment of the present disclosure. For example, the term "one embodiment" means "at least one embodiment"; The term "another embodiment" means "at least one additional embodiment"; The term "some embodiments" means "at least some embodiments". Furthermore, the appearances of the phrases "in one embodiment", "in some embodiments" or "in embodiments" in various places throughout the specification do not necessarily all refer to the same embodiment, but may also refer to the same embodiment.

It should be noted that the concepts of "first" and "second" mentioned in the present disclosure are only used to distinguish different devices, modules or units, and are not used to define the order or interdependence of functions performed by these devices, modules or units. Unless otherwise specified, the concepts of "first", "second" and the like are not intended to imply that the objects so described must be in a given order in time, space, ranking or in any other way.

It should be noted that the modifications of "a" and "a plurality of" mentioned in the present disclosure are illustrative and not restrictive, and those skilled in the art should understand that it should be understood as "one or more" unless the context clearly indicates otherwise.

The names of messages or information exchanged between multiple devices in the embodiments of the present disclosure are for illustrative purposes only, and are not used to limit the scope of these messages or information.

Embodiments of the present disclosure will be described in detail with reference to the accompanying drawings, but the present disclosure is not limited to these specific embodiments. The following specific embodiments can be combined with each other, and the same or similar concepts or processes may not be repeated in some embodiments. Furthermore, in one or more embodiments, specific features, structures, or characteristics may be combined in any suitable manner that will be apparent to those of ordinary skill in the art from the present disclosure.

It should be understood that the present disclosure does not limit how to obtain images to be applied/processed. In one embodiment of the present disclosure, it can be obtained from a storage device, such as an internal memory or an external storage device, and in another embodiment of the present disclosure, a photographing component can be mobilized to photograph. It should be noted that the acquired image can be an acquired image or a frame of an acquired video, and is not particularly limited to this.

In the context of the present disclosure, an image may refer to any one of a variety of images, such as a color image, a grayscale image, and the like. It should be noted that in the context of this specification, the types of images are not particularly limited. In addition, the image may be any suitable image, such as an original image obtained by an imaging device, or an image that has undergone specific processing on the original image, such as preliminary filtering, de-aliasing, color adjustment, contrast adjustment, normalization, and the like. It should be noted that the preprocessing operation may also include other types of preprocessing operations known in the art, which will not be described in detail here.

Images have many attributes, and each attribute includes multiple categories. For example, face images have attributes such as hairstyle, expression, age, gender, race and skin color. Men's hairstyles include crew cut, flat-top, etc. Women's hairstyles include bob, Pixie cut, bun, ponytail, dreadlocks, etc. However, many attributes of images have unclear category boundaries, numerous categories and unbalanced distribution of categories. The unbalanced category distribution of the sample data used to train the attribute recognition model will lead to the decrease of the recognition accuracy of the attribute recognition model. In addition, if the sample data with unbalanced category distribution cannot be supplemented directionally quickly, it will cause serious bottleneck to the development process of attribute recognition model.

According to the present disclosure, the attribute recognition ability is rapidly formed through a small number of labeled samples, thereby a large number of collected unlabeled data are labeled with pseudo-labels and the category distribution is counted, and finally, the data is supplemented directionally and rapidly according to the gap between the current distribution and the expected distribution. According to the technical solutions of the present disclosure, the time required by the sample data acquisition process can be reduced, and then the development process of the attribute recognition model is accelerated. In addition, the technical solutions of the present disclosure can make the category distribution of sample data more reasonable, thereby improving the recognition accuracy of the attribute recognition model.

FIG. 1 is a flowchart illustrating an image processing method 100 according to some embodiments of the present disclosure. At step S101, a set of image samples for training an attribute recognition model is acquired. The acquired set of image samples includes a first subset of image samples with category labels and a second subset of image samples without category labels.

In some embodiments of the present disclosure, a predetermined number of image samples are selected for each category to form a subset of image samples. The predetermined number may be much smaller than the number of image samples in the set of image samples. For example, when the set of image samples has 500,000 image samples, 50 image samples can be selected for each category to form the first subset of image samples.

In some embodiments of the present disclosure, the first subset of image samples may be randomly selected from the acquired set of image samples. For example, some image samples may be randomly selected from the set of image samples as the first subset of image samples. The image processing method 100 can obtain the category labels of the first subset of image samples after selecting the first subset of image samples. The category labels can be manually entered by a person.

In some embodiments of the present disclosure, the category labels of the first subset of image samples may be pre-assigned. For example, some image samples in the acquired set of image samples may have pre-assigned category labels. Part or all of the image samples with pre-assigned category labels can be selected as the first subset of image samples.

The set of image samples can come from one or more data sources, including, for example, storage devices that store collected images and some websites that provide image samples. In some embodiments of the present disclosure, the first subset of image samples and the second subset of image samples may be acquired from different data sources. For example, image samples from some data sources have pre-assigned category labels. Part or all of the image samples obtained from these data sources can be taken as the first subset of image samples. Image samples of some data sources do not have pre-assigned category labels. Part or all of the image samples obtained from these data sources can be taken as the second subset of image samples.

In some cases, most or all of the image samples in the set of image samples do not have category labels, so their category distribution is unknown. In these cases, it is not known whether image samples need to be supplemented or which categories of image samples need to be supplemented. Embodiments of the present disclosure can predict the category distribution of set of image samples by training a sample prediction model using a first subset of image samples and predicting the categories of image samples in a second subset of image samples using the trained sample prediction model. After determining the category distribution of the set of image samples, it can be determined whether and which categories of image samples need to be supplemented according to the category distribution.

At step S102, a sample prediction model is trained using the first subset of image samples. At step S103, the category of the image samples in the second subset of image samples is predicted by using the trained sample prediction model. For example, a pseudo label (predicted category) may be assigned to the image samples in the second subset of image samples as a category label of the second subset of image samples.

In some embodiments of the present disclosure, the sample prediction model may be a Few-Shot Learning model, such as a Pretraining model and a meta-learning model. Using the Few-Shot Learning model can quickly form the ability of attribute recognition, thus quickly predicting the category distribution of set of image samples.

Some existing attribute recognition models can be used as the Pretraining model. A existing attribute recognition model related to the attributes to be recognized or with similar characteristics can be selected as the Pretraining model. For example, for hair style attributes, there may already be models that can identify the length of hair (e.g., long hair, shoulder-length hair, short hair), but there is no model that can identify specific hair styles (e.g., crew cut, flat-top, bob, Pixie cut, bun, ponytail, dreadlocks, etc.). Therefore, a model for identifying the length of hair can be used as a sample prediction model for hairstyle attributes.

The meta-learning model obtained by meta-learning method can be used as the sample prediction model. The meta-learning method can be an "N-way K-shot" classification learning process. Here, N is the number of categories to be classified in each classification study, and k is the number of samples of each category in the training set. That is to say, in each learning process, K+1 samples of N categories are randomly selected. K samples of each category constitute a training set, and the remaining 1 sample of each category constitutes a test set.

At step S104, the category distribution of the set of image samples is determined based on the category label of the first subset of image samples and the predicted category of the second subset of image samples. At step S105, it is judged whether the determined category distribution conforms to the expected category distribution. The expected category distribution may include at least one of Uniform distribution and Gaussian distribution. In some embodiments of the present disclosure, determining the category distribution of the set of image samples includes determining the number of image samples of each category. If the difference between the number of image samples of a certain category in the set of image samples and the expected number is greater than or equal to the predetermined number difference, the category distribution of the set of image samples does not conform to the expected category distribution. In some embodiments of the present disclosure, determining the category distribution of the set of image samples includes determining the ratio of image samples of each category. If the difference between the ratio of a certain category of image samples in the set of image samples and the expected ratio is greater than or equal to the predetermined ratio difference, the category distribution of the set of image samples does not conform to the expected category distribution.

In a case where the determined category distribution does not conform to the expected category distribution, the image processing method 100 proceeds to step S106. At step S106, new image samples are directionally acquired, and the acquired new image samples are added to the set of image samples so that the category distribution of the set of image samples conforms to the expected category distribution. In some embodiments of the present disclosure, step S106 may include determining the category that does not reach the expected number or ratio in the category distribution, and acquiring new image samples of the categories that does not reach the expected number or ratio.

In some embodiments of the present disclosure, the new image samples can be acquired from the database through keyword search or picture search. For example, in the case of insufficient image samples of the pigtail category, new image samples of the pigtail category can be obtained from the database through the keyword "pigtail". In some embodiments of the present disclosure, new image samples may be generated by picture editing. For example, in the case of insufficient image samples of the flat-top category, new image samples of the flat-top category can be obtained by editing image samples of other categories (for example, trimming hair in image samples of other categories as flat-top). In some embodiments of the present disclosure, new image samples can also be acquired in real time by the camera.

In some embodiments of the present disclosure, step S106 may include predicting the category of the new image samples using the trained sample prediction model, and discarding a new image sample if the predicted category of the new image sample is not the determined category that does not reach the expected number or the expected ratio. In some embodiments of the present disclosure, step S106 may include determining the number of new image samples to be acquired for each category, and acquiring the determined number of new image samples for the category.

In some embodiments of the present disclosure, the image processing method 100 may further include step S107, in which an attribute recognition model is trained using the set of image samples. In a case where the determined category distribution does not conform to the expected category distribution, the image processing method 100 proceeds from step S105 to step S106 and then proceeds to step S107. In a case where the determined category distribution conforms to the expected category distribution, the image processing method 100 directly proceeds from step S105 to step S107.

In some embodiments of the present disclosure, step S107 may train the attribute recognition model without acquiring the category label of the set of image samples. For example, the attribute recognition model can be trained by unsupervised learning or self-supervised learning. In some embodiments of the present disclosure, step S107 may obtain the category labels of the set of image samples before training the attribute recognition model. For example, category labels manually entered by a person can be acquired. After acquiring the category labels of the set of image samples, the attribute recognition model can be trained by supervised learning. In most cases, the manually entered category labels are more accurate than the categories predicted by the sample prediction model, so a more accurate attribute recognition model can be obtained by using the set of image samples with manually entered category labels.

In some embodiments of the present disclosure, the category label, predicted category and category distribution in the image processing method 100 are all for a particular attribute (for example, a certain attribute of a human face). An image sample can have multiple attributes. For example, a face image can have attributes such as hairstyle, expression, age, gender, race and skin color. For different attributes, the category distribution of set of image samples may be different. Therefore, multiple set of image samples can be obtained for multiple attribute recognition tasks, respectively. However, there may be some identical image samples among the multiple set of image samples. For example, some image samples can be used to recognize both hairstyle and expression.

Figure 2:
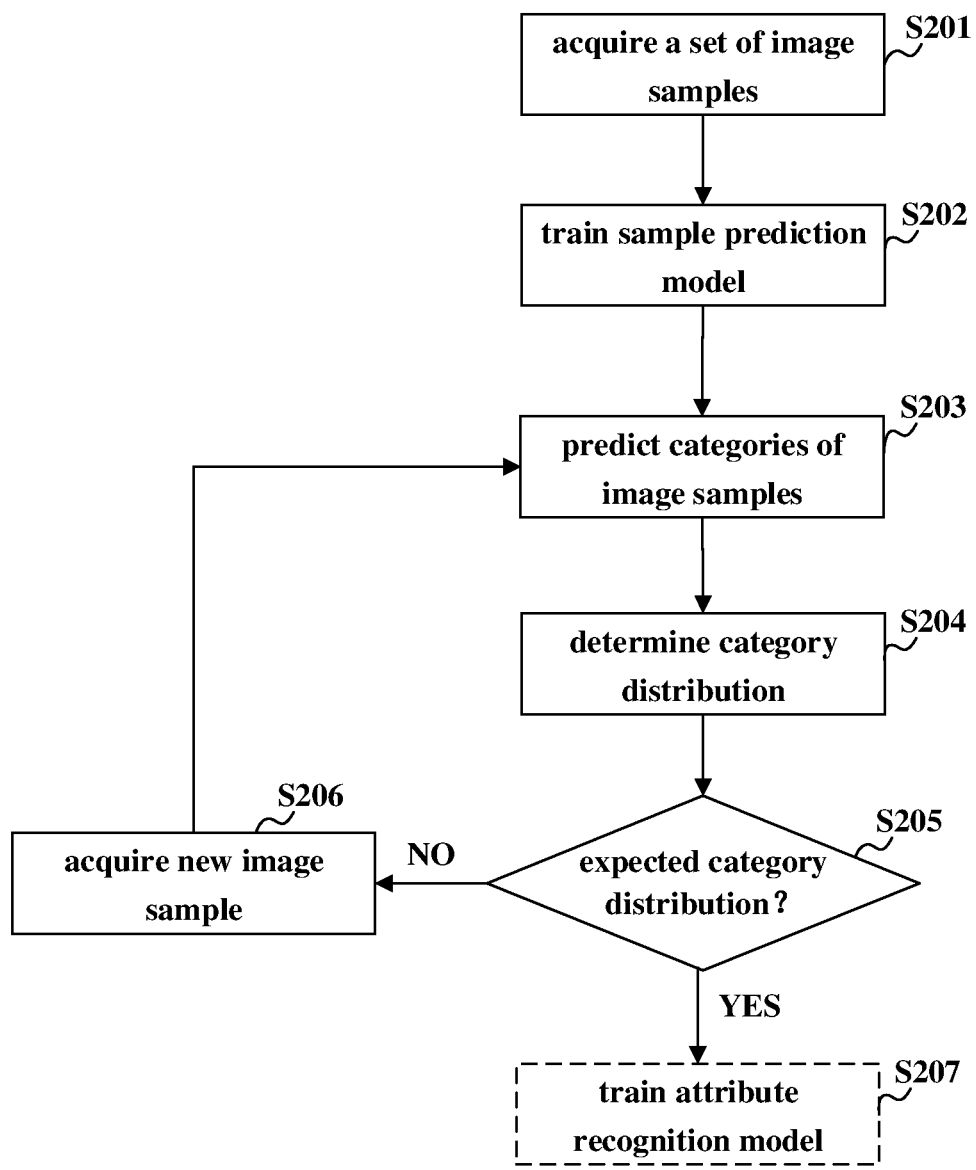
FIG. 2 is a block diagram illustrating another image processing method according to some embodiments of the present disclosure.

FIG. 2 is a block diagram illustrating another image processing method 200 according to some embodiments of the present disclosure. In FIG. 2, steps S201 to S207 are substantially the same as steps S101 to S107 in FIG. 1. However, after step S206, the image processing method 200 returns to steps S203, S204, and S205 (instead of proceeding to step S207) to predict the category of new image samples, determine the category distribution of the set of image samples to which the new image samples are added, and judge whether the redetermined category distribution conforms to the expected category distribution. In case the redetermined category distribution does not conform to the expected category distribution, the image processing method 200 proceeds to step S206 to directionally acquire other new image samples. As described above, steps S203 to S206 are repeatedly executed until the category distribution of the set of image samples meets the expected category distribution. In case that the category distribution of the set of image samples conform to the expected category distribution, the image processing method 200 may proceed to step S207 to train the attribute recognition model by using the set of image samples. Since the specific implementation of each step in FIG. 2 is substantially the same as the specific implementation of each step in FIG. 1, it will not be repeated here.

Figure 3:
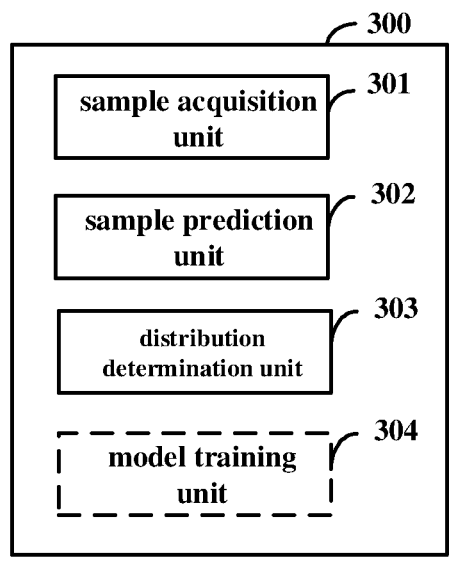
FIG. 3 is a block diagram illustrating an image processing apparatus according to some embodiments of the present disclosure.

FIG. 3 is a block diagram illustrating an image processing apparatus 300 according to some embodiments of the present disclosure. As shown in FIG. 3, the image processing apparatus 300 includes a sample acquisition unit 301, a sample prediction unit 302, and a distribution determination unit 303. The sample acquisition unit 301 is configured to acquire a set of image samples for training an attribute recognition model. The acquired set of image samples includes a first subset of image samples with category labels and a second subset of image samples without category labels. The sample prediction unit 302 is configured to train a sample prediction model using the first subset of image samples, and identify the category of image samples in the second subset of image samples using the trained sample prediction model. The distribution determination unit 303 is configured to determine the category distribution of the set of image samples based on the category label of the first subset of image samples and the predicted category of the second subset of image samples. The sample acquisition unit 301 directionally acquires new image samples when the determined category distribution does not conform to the expected category distribution, and adds the acquired new image samples to the set of image samples so that the category distribution of the set of image samples conforms to the expected category distribution.

In some embodiments of the present disclosure, the image processing device 300 may further include a model training unit 304. The model training unit 304 trains the attribute recognition model by using the set of image samples acquired by the sample acquisition unit 301.

Since the specific implementation of the operations performed by each unit in FIG. 3 has been described in detail above, it will not be repeated here.

As described above, the embodiment of the present disclosure trains the sample prediction model by using some image samples in the set of image samples, and predicts the category of the remaining image samples by the sample prediction model, thereby quickly determining the category distribution of the set of image samples. According to the determined category distribution, it can be determined whether new image samples need to be supplemented and which categories of image samples need to be supplemented. As the embodiment of the present disclosure can directionally supplement new image samples, the set of image samples with reasonable category distribution can be obtained more quickly, thereby accelerating the development speed of the attribute recognition model. In addition, the embodiments of the present disclosure can obtain a image sample set with reasonable category distribution. Using this set of image samples to train the attribute recognition model can improve the accuracy of the attribute recognition model.

It should be noted that the above-mentioned units are only logical modules divided according to the specific functions they implement, and are not used to limit the specific implementation, for example, they can be implemented in software, hardware or a combination of software and hardware. In actual implementation, the above units can be realized as independent physical entities, or can be realized by a single entity (for example, a processor (CPU or DSP, etc.), an integrated circuit, etc.). In addition, the above-mentioned units are shown with dashed lines in the drawings, indicating that these units may not actually exist, and the operations/functions they realize may be realized by the processing circuit itself.

In addition, although not shown, the device may also include a memory, which may store various information generated by the device, various units included in the device in operation, programs and data for operation, data to be transmitted by the communication unit, and the like. The memory may be volatile memory and/or nonvolatile memory. For example, the memory may include, but is not limited to, random access memory (RAM), dynamic random access memory (DRAM), static random access memory (SRAM), read only memory (ROM), and flash memory. Of course, the memory may also be located outside the device. Optionally, although not shown, the apparatus may also include a communication unit, which may be used to communicate with other devices. In an example, the communication unit may be implemented in an appropriate manner known in the art, for example, including communication components such as antenna arrays and/or radio frequency links, various types of interfaces, communication units, and the like. It will not be described in detail here. In addition, the device may also include other components not shown, such as a radio frequency link, a baseband processing unit, a network interface, a processor, a controller, and the like. It will not be described in detail here.

Figure 4:
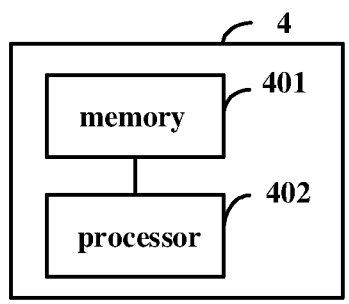
FIG. 4 is a block diagram illustrating an electronic device according to some embodiments of the present disclosure.

Some embodiments of the present disclosure also provide an electronic device. FIG. 4 is a block diagram illustrating an electronic device according to some embodiments of the present disclosure. For example, in some embodiments, the electronic device 4 may be various types of devices, including but not limited to mobile terminals such as mobile phones, notebook computers, digital broadcast receivers, PDA (Personal Digital Assistant), PAD (Tablet PC), PMP (Portable Multimedia Player), vehicle-mounted terminals (such as vehicle-mounted navigation terminals), and fixed terminals such as digital TV, desktop computers, and the like. For example, the electronic device 4 may include a display panel for displaying data and/or execution results utilized in the scheme according to the present disclosure. For example, the display panel may have various shapes, such as a rectangular panel, an oval panel, a polygonal panel, and the like. In addition, the display panel can be not only a flat panel, but also a curved panel or even a spherical panel.

As shown in FIG. 4, the electronic device 4 of this embodiment includes a memory 401 and a processor 402 coupled to the memory 401. It should be noted that the components of the electronic device 40 shown in FIG. 4 are only exemplary, not restrictive, and the electronic device 40 may also have other components according to practical application requirements. The processor 402 may control other components in the electronic device 4 to perform expected functions.

In some embodiments, the memory 401 is used to store one or more computer readable instructions. When the processor 402 is used to execute computer readable instructions, the computer readable instructions are executed by the processor 402 to implement the method according to any of the above embodiments. For the specific implementation of each step of the method and related explanations, please refer to the above embodiments, and the repetition is not repeated here.

For example, the processor 402 and the memory 401 can communicate with each other directly or indirectly. For example, the processor 402 and the memory 401 may communicate over a network. The network may include a wireless network, a wired network, and/or any combination of wireless and wired networks. The processor 402 and the memory 401 can also communicate with each other through the system bus, which is not limited by the present disclosure.

For example, the processor 402 can be embodied as various suitable processors and processing devices, such as a central processing unit (CPU), a Graphics Processing Unit (GPU), a network processor (NP), etc. It can also be a digital signal processor (DSP), an application specific integrated circuit (ASIC), a field programmable gate array (FPGA) or other programmable logic devices, discrete gate or transistor logic devices, and discrete hardware components. A central processing unit (CPU) can be X86 or ARM architecture. For example, the memory 401 may include any combination of various forms of computer-readable storage media, such as volatile memory and/or nonvolatile memory. The memory 401 may include, for example, a system memory which stores, for example, an operating system, an application program, a Boot Loader, a database, and other programs. Various applications and various data can also be stored in the storage medium.

Figure 5:
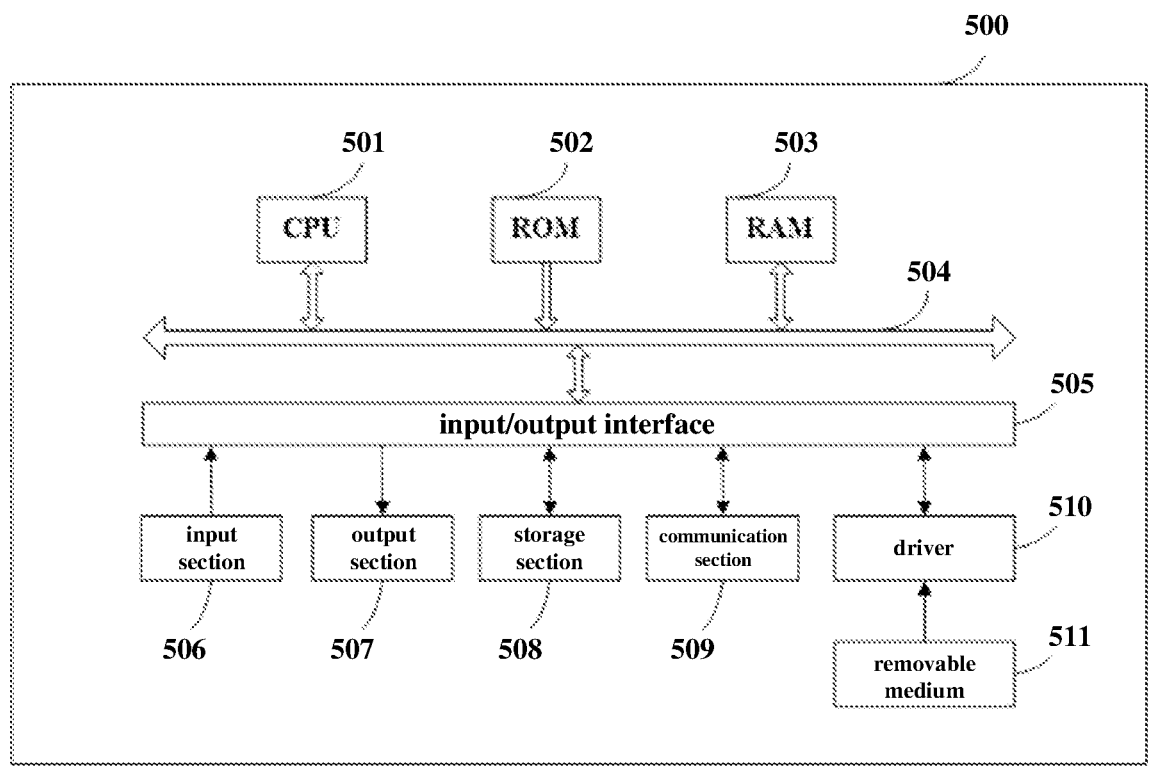
FIG. 5 is a block diagram illustrating an example structure of a computer system that may be employed in some embodiments of the present disclosure.

In addition, according to some embodiments of the present disclosure, when various operations/processes according to the present disclosure are implemented by software and/or firmware, programs constituting the software can be installed from a storage medium or a network to a computer system having a dedicated hardware structure, such as the computer system 500 shown in FIG. 5, which can perform various functions including functions such as those described above when various programs are installed. FIG. 5 is a block diagram showing an example structure of a computer system that may be employed in some embodiments of the present disclosure.

In FIG. 5, a central processing unit (CPU) 501 executes various processes according to programs stored in a read only memory (ROM) 502 or programs loaded from a storage section 508 to a random access memory (RAM) 503. In the RAM 503, data required when the CPU 501 executes various processes and the like is also stored as required. The central processing unit is only exemplary, and it can also be other types of processors, such as the various processors described above. ROM 502, RAM 503 and storage section 508 may be various forms of computer-readable storage media, as described below. It should be noted that although ROM 502, RAM 503 and storage device 508 are shown in FIG. 5 respectively, one or more of them may be combined or located in the same or different memories or storage modules.

A CPU 501, a ROM 502 and a RAM 503 are connected to each other via a bus 504. Input/output interface 505 is also connected to bus 504.

The following components are connected to the input/output interface 505: an input section 506 such as a touch screen, a touch pad, a keyboard, a mouse, an image sensor, a microphone, an accelerometer, a gyroscope, etc. Output section 507 including a display such as a cathode ray tube (CRT), a liquid crystal display (LCD), a speaker, a vibrator, etc. A storage section 508, including a hard disk, a magnetic tape, etc. And communication section 509 including network interface cards such as LAN cards, modems, etc. The communication section 509 allows communication processing to be performed via a network such as the Internet. It is easy to understand that although each device or module in the computer system 500 is shown in FIG. 5 to communicate through the bus 504, they can also communicate through a network or other means, wherein the network can include a wireless network, a wired network, and/or any combination of wireless networks and wired networks.

A driver 510 is also connected to the input/output interface 505 as required. A removable medium 511, such as a magnetic disk, an optical disk, a magneto-optical disk, a semiconductor memory, etc., is installed on the driver 510 as required, so that a computer program read therefrom is installed in the storage section 508 as required.

In a case where the above series of processes are realized by software, a program constituting the software may be installed from a network such as the Internet or a storage medium such as the removable medium 511.

According to embodiments of the present disclosure, the process described above with reference to the flowchart may be implemented as a computer software program. For example, embodiments of the present disclosure include a computer program product including a computer program carried on a computer readable medium, the computer program containing program code for executing the method shown in the flowchart. In such embodiments, the computer program can be downloaded and installed from the network through the communication device 509, or installed from the storage device 508 or from the ROM 502. When the computer program is executed by the CPU 501, the above functions defined in the method of the embodiment of the present disclosure are executed.

It should be noted that in the context of the present disclosure, a computer-readable medium may be a tangible medium, which may contain or store a program for use by or in connection with an instruction execution system, apparatus or device. The computer-readable medium can be a computer-readable signal medium or a computer-readable storage medium or any combination of the two. The computer-readable storage medium can be, for example, but not limited to, an electrical, magnetic, optical, electromagnetic, infrared, or semiconductor system, device, or device, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which can be used by or in connection with an instruction execution system, apparatus or device. In the present disclosure, the computer-readable signal medium may include a data signal propagated in baseband or as a part of a carrier wave, in which the computer-readable program code is carried. This propagated data signal can take various forms, including but not limited to electromagnetic signals, optical signals or any suitable combination of the above. A computer-readable signal medium can also be any computer-readable medium other than a computer-readable storage medium, which can send, propagate or transmit a program for use by or in connection with an instruction execution system, apparatus or device. The program code contained on the computer-readable medium can be transmitted by any suitable medium, including but not limited to electric wires, optical cables, RF (Radio Frequency), etc., or any suitable combination of the above.

The computer readable medium may be included in the electronic device; or it may exist alone and not be assembled into the electronic device.

In some embodiments, there is also provided a computer program comprising instructions that, when executed by a processor, cause the processor to perform the method of any of the above embodiments. For example, the instructions may be embodied as computer program code.

In embodiments of the present disclosure, computer program codes for performing the operations of the present disclosure may be written in one or more programming languages or a combination thereof, including but not limited to object-oriented programming languages such as Java, Smalltalk, C++, and conventional procedural programming languages such as "C" language or similar programming languages. The program code can be executed completely on the user computer, partially on the user computer, as an independent software package, partially on the user computer, partially on a remote computer, or completely on a remote computer or server. In a case involving a remote computer, the remote computer may be connected to a user computer through any kind of network (including a local area network (LAN) or a wide area network (WAN)), or may be connected to an external computer (for example, connected through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code containing one or more executable instructions for implementing specified logical functions. It should also be noted that in some alternative implementations, the functions noted in the blocks may also occur in a different order from those noted in the drawings. For example, two blocks represented in succession may actually be executed in substantially parallel, or they may sometimes be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or operations, or can be implemented with combinations of dedicated hardware and computer instructions.

The modules, components or units described in the embodiments of the present disclosure can be implemented by software or hardware. Among them, the name of a module, component or unit does not constitute the definition of the module, component or unit itself under certain circumstances.

The functions described above herein may be performed at least in part by one or more hardware logic components. For example, without limitation, exemplary hardware logic components that can be used include: field programmable gate array (FPGA), application specific integrated circuit (ASIC), application specific standard product (ASSP), system on chip (SOC), complex programmable logic device (CPLD), etc.

According to some embodiments of the present disclosure, an image processing method is provided, comprising: acquiring a set of image samples for training an attribute recognition model, wherein the set of image samples comprises a first subset of image samples with category labels and a second subset of image samples without category labels; training a sample prediction model using the first subset of image samples, and predicting categories of the image samples in the second subset of image samples using the trained sample prediction model; determining a category distribution of the set of image samples based on the category labels of the first subset of image samples and the predicted categories of the second subset of image samples; and acquiring a new image sample directionally if the determined category distribution does not conform to an expected category distribution, and adding the acquired new image sample to the set of image samples so that the category distribution of the set of image samples conforms to the expected category distribution.

According to some embodiments of the present disclosure, the first subset of image samples includes a predetermined number of image samples for each category.

According to some embodiments of the present disclosure, the first subset of image samples is selected randomly from the set of image samples, and the image processing method further comprises acquiring the category labels of the first subset of image samples.

According to some embodiments of the present disclosure, the category labels of the first subset of image samples are pre-assigned.

According to some embodiments of the present disclosure, data sources of the first subset of image samples and the second subset of image samples are different.

According to some embodiments of the present disclosure, the sample prediction model is a Few-Shot Learning model.

According to some embodiments of the present disclosure, the Few-Shot Learning model comprises at one of a Pretraining model or a meta-learning model.

According to some embodiments of the present disclosure, the expected category distribution includes at least one of Uniform distribution and Gaussian distribution.

According to some embodiments of the present disclosure, the acquiring the new image sample directionally if the determined category distribution does not conform to the expected category distribution comprises: determining a category which does not reach an expected number or an expected ratio in the determined category distribution; and acquiring the new image sample of the category that does not reach the expected number or the expected ratio.

According to some embodiments of the present disclosure, the new image sample is acquired by searching a database with a keyword or a picture.

According to some embodiments of the present disclosure, the new image sample is generated by picture editing.

The image processing method according to some embodiments of the present disclosure further comprises predicting a category of the new image sample using the trained sample prediction model, and discarding the new image sample if the predicted category of the new image sample is not the determined category that does not reach the expected number or the expected ratio.

The image processing method according to some embodiments of the present disclosure further comprises redetermining the category distribution of the set of image samples, and acquiring an additional new image sample if the redetermined category distribution does not conform to the expected category distribution.

According to some embodiments of the present disclosure, the image processing method further comprises acquiring category labels of the set of image samples.

The image processing method according to some embodiments of the present disclosure further comprises training the attribute recognition model using the set of image samples.

According to some embodiments of the present disclosure, the category labels, the predicted categories and the category distribution belong to a particular attribute.

According to some embodiments of the present disclosure, the particular attribute is an attribute of a human face.

According to some embodiments of the present disclosure, there is provided an electronic device including a memory; and a processor coupled to the memory, wherein instructions are stored in the memory, and and the instructions when executed by the processor cause the electronic device to perform a method according to embodiments of the present disclosure.

According to some embodiments of the present disclosure, there is provided a computer-readable storage medium with computer program stored thereon which, when executed by a processor, implements a method according to embodiments of the present disclosure.

According to some embodiments of the present disclosure, there is provided an image processing apparatus, comprising: a sample acquisition unit configured to acquire a set of image samples for training an attribute recognition model, wherein the set of image samples comprises a first subset of image samples with category labels and a second subset of image samples without category labels; a sample prediction unit configured to train a sample prediction model with the first subset of image samples and identify categories of the image samples in the second subset of image samples using the trained sample prediction model; and a distribution determination unit configured to determine the category distribution of the set of image samples based on the category labels of the first subset of image samples and the predicted categories of the second subset of image samples, wherein the sample acquisition unit acquires a new image sample directionally if the determined category distribution does not conform to an expected category distribution, and adds the acquired new image sample to the set of image samples so that the category distribution of the set of image samples conform to the expected category distribution.

According to some embodiments of the present disclosure, there is provided a computer program comprising instructions that, when executed by a processor, cause the processor to perform a method according to embodiments of the present disclosure.

According to some embodiments of the present disclosure, there is provided a computer program product comprising instructions that when executed by a processor implement a method according to embodiments of the present disclosure.

The above description is only an explanation of some embodiments of the disclosure and the applied technical principles. It should be understood by those skilled in the art that the disclosure scope involved in the present disclosure is not limited to the technical solutions formed by the specific combination of the above technical features, but also covers other technical solutions formed by any combination of the above technical features or their equivalent features without departing from the above disclosure concept. For example, the technical solutions formed by replacing the above features with the technical features with similar functions disclosed in the present disclosure (but not limited to).

In the description provided herein, many specific details are set forth. However, it is understood that embodiments of the present disclosure may be practiced without these specific details. In other cases, well-known methods, structures and techniques have not been shown in detail in order not to obscure the understanding of this description.

Furthermore, although the operations are depicted in a particular order, this should not be understood as requiring that the operations be performed in the particular order shown or performed in a sequential order. Under certain circumstances, multitasking and parallel processing may be advantageous. Likewise, although several specific implementation details are included in the above discussion, these should not be interpreted as limitations on the scope of the present disclosure. Certain features described in the context of separate embodiments may also be implemented in a single embodiment in combination. On the contrary, various features described in the context of a single embodiment can also be implemented in multiple embodiments individually or in any suitable sub-combination.

Although some specific embodiments of the disclosure have been described in detail by examples, it should be understood by those skilled in the art that the above examples are for illustration only, and are not intended to limit the scope of the disclosure. It should be understood by those skilled in the art that modifications can be made to the above embodiments without departing from the scope and spirit of the present disclosure. The scope of the present disclosure is defined by the appended claims.

What is claimed is:

1. An image processing method, comprising:
   acquiring a set of training image samples for training an attribute recognition model, wherein the set of training image samples comprises a first subset of training image samples with category labels and a second subset of training image samples without category labels;
   training a sample prediction model using the first subset of training image samples with category labels, and predicting categories of the training image samples in the second subset of training image samples without category labels using the trained sample prediction model;
   determining a category distribution of the set of training image samples based on the category labels of the first subset of training image samples and the predicted categories of the second subset of training image samples; and
   acquiring a new training image sample directionally if the determined category distribution does not conform to a certain category distribution, and updating the set of training image samples by adding the acquired new training image sample to the set of training image samples so that the category distribution of the updated set of training image samples conforms to the certain category distribution, wherein the certain category distribution is a certain number or a certain ratio in the determined category distribution;
   wherein the conforming of the determined category distribution to the certain category distribution comprises:
   determining a category which does not reach a certain number or a certain ratio in the determined category distribution, which indicates the determined category distribution does not conform to the certain category distribution; and
   acquiring the new training image sample of the category that does not reach the certain number or the certain ratio.

2. The image processing method of claim 1, wherein the first subset of training image samples includes a predetermined number of training image samples for each category.

3. The image processing method according to claim 1, wherein the first subset of training image samples is selected randomly from the set of training image samples, and the training image processing method further comprises acquiring the category labels of the first subset of training image samples.

4. The image processing method according to claim 1, wherein the category labels of the first subset of training image samples are pre-assigned.

5. The image processing method of claim 4, wherein data sources of the first subset of training image samples and the second subset of training image samples are different.

6. The image processing method according to claim 1, wherein the sample prediction model is a Few-Shot Learning model.

7. The image processing method according to claim 6, wherein the Few-Shot Learning model comprises at least one of a Pretraining model or a meta-learning model.

8. The image processing method according to claim 1, wherein the certain category distribution includes at least one of Uniform distribution or Gaussian distribution.

9. The image processing method according to claim 1, wherein the new training image sample is acquired by searching a database with a keyword or a picture.

10. The image processing method according to claim 1, wherein the new training image sample is generated by picture editing.

11. The image processing method according to claim 1, further comprising:
    predicting a category of the new training image sample using the trained sample prediction model, and discarding the new training image sample if the predicted category of the new training image sample is not the determined category that does not reach the certain number or the certain ratio.

12. The image processing method according to claim 1, further comprising:
    redetermining the category distribution of the updated set of training image samples, and acquiring an additional new training image sample if the redetermined category distribution does not conform to the certain category distribution.

13. The image processing method according to claim 1, further comprising:
    acquiring category labels of the updated set of training image samples.

14. The image processing method according to claim 1, further comprising:

training the attribute recognition model using the updated set of training image samples.

15. The image processing method according to claim 1, wherein the category labels, the predicted categories and the category distribution belong to a particular attribute.

16. The image processing method according to claim 15, wherein the particular attribute is an attribute of a human face.

17. An electronic device comprising:
a memory; and
a processor coupled to the memory, wherein instructions are stored in the memory, and the instructions when executed by the processor cause the electronic device to:
acquire a set of training image samples for training an attribute recognition model, wherein the set of training image samples comprises a first subset of training image samples with category labels and a second subset of training image samples without category labels;
train a sample prediction model using the first subset of training image samples with category labels, and predict categories of the training image samples in the second subset of training image samples without category labels using the trained sample prediction model;
determine a category distribution of the set of training image samples based on the category labels of the first subset of training image samples and the predicted categories of the second subset of training image samples; and
acquire a new training image sample directionally if the determined category distribution does not conform to a certain category distribution, and update the set of training image samples by adding the acquired new training image sample to the set of training image samples so that the category distribution of the updated set of training image samples conforms to the certain category distribution, wherein the certain category distribution is a certain number or a certain ratio in the determined category distribution;
wherein the conforming of the determined category distribution to the certain category distribution comprises:
determining a category which does not reach a certain number or a certain ratio in the determined category distribution which indicates the determined category distribution does not conform to the certain category distribution; and
acquiring the new training image sample of the category that does not reach the certain number or the certain ratio.

18. A non-transitory computer-readable storage medium with computer program stored thereon which, when executed by a processor, cause the processor to:
acquire a set of training image samples for training an attribute recognition model, wherein the set of training image samples comprises a first subset of training image samples with category labels and a second subset of training image samples without category labels;
train a sample prediction model using the first subset of training image samples with category labels, and predict categories of the training image samples in the second subset of training image samples without category labels using the trained sample prediction model;
determine a category distribution of the set of training image samples based on the category labels of the first subset of training image samples and the predicted categories of the second subset of training image samples; and
acquire a new training image sample directionally if the determined category distribution does not conform to a certain category distribution, and update the set of training image samples by adding the acquired new training image sample to the set of training image samples so that the category distribution of the updated set of training image samples conforms to the certain category distribution, wherein the certain category distribution is a certain number or a certain ratio in the determined category distribution;
wherein the conforming of the determined category distribution to the certain category distribution comprises:
determining a category which does not reach a certain number or a certain ratio in the determined category distribution, which indicates the determined category distribution does not conform to the certain category distribution; and
acquiring the new training image sample of the category that does not reach the certain number or the certain ratio.

* * * * *